United States Patent
Oriani

(10) Patent No.: US 9,051,460 B2
(45) Date of Patent: Jun. 9, 2015

(54) HEAT RESISTANT HYDROCARBON ELASTOMER COMPOSITIONS

(71) Applicant: E I DU PONT DE NEMOURS AND COMPANY, Wilmington, DE (US)

(72) Inventor: Steven R Oriani, Landenberg, PA (US)

(73) Assignee: E.I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/084,995

(22) Filed: Nov. 20, 2013

(65) Prior Publication Data

US 2014/0155538 A1    Jun. 5, 2014

Related U.S. Application Data

(60) Provisional application No. 61/733,074, filed on Dec. 4, 2012, provisional application No. 61/733,090, filed on Dec. 4, 2012.

(51) Int. Cl.
| | |
|---|---|
| *C08L 77/00* | (2006.01) |
| *C08L 23/16* | (2006.01) |
| *C08L 23/08* | (2006.01) |

(52) U.S. Cl.
CPC ............ *C08L 23/16* (2013.01); *C08L 23/0807* (2013.01); *C08L 77/00* (2013.01)

(58) Field of Classification Search
USPC ........................................................ 524/514
See application file for complete search history.

(56) References Cited

U.S. PATENT DOCUMENTS

| | | | |
|---|---|---|---|
| 4,174,358 | A | 11/1979 | Epstein |
| 4,275,180 | A | 6/1981 | Clarke |
| 4,310,638 | A | 1/1982 | Coran et al. |
| 4,694,042 | A | 9/1987 | McKee et al. |
| 5,070,145 | A | 12/1991 | Guerdoux |
| 5,591,798 | A | 1/1997 | Patel |
| 5,777,033 | A | 7/1998 | Venkataswamy et al. |
| 5,948,503 | A | 9/1999 | Yamamoto et al. |
| 7,544,757 | B2 | 6/2009 | Wu et al. |
| 7,691,943 | B2 * | 4/2010 | Hoffmann et al. ............... 525/60 |
| 7,915,336 | B2 * | 3/2011 | Varnhorn et al. ............. 524/507 |
| 8,791,180 | B2 * | 7/2014 | Oriani .......................... 524/106 |
| 2006/0004147 | A1 | 1/2006 | Park et al. |

FOREIGN PATENT DOCUMENTS

| | | |
|---|---|---|
| EP | 1081188 A1 | 3/2001 |
| EP | 2098566 A1 | 2/2009 |
| JP | H10-251452 | 9/1998 |
| JP | 2011-1191387 A | 7/2001 |
| KR | 20090053585 A | 5/2009 |
| WO | 2012177879 A1 | 12/2012 |

OTHER PUBLICATIONS

Ma et al., Polymer 43, 937-945, 2002.*
International Search Report for International Application No. PCT/US2013/072951, Feb. 26, 2014.
Yu et al.: "Effect of EVM/EVA-g-MAH ratio on the structure and properties of nylon 1010 blends", Journal of Polymer Science Part B: Polymer Physics, vol. 47, No. 9, May 1, 2009, pp. 877-887, XP055109122, ISSN: 0887-6266, DOI: 10.1002/polb.21693.
Zeon Chemicals L.P., HyTemp® Technical Manual, Rev. 2009-1, p. 46 (2009).
Welker et al., "A New EPDM Grade with Improved Processing Characteristics for Automotive Hose Applications", present at the ACS Rubber Division technical meeting Oct. 2011.
Ma et al., "Effects of compatibilizing agent and in situ fibril on the morphology, interface and mechanical properties of EPDM/nylon copolymer blends", Polymer 43 (2002) pp. 937-945.
Liu et al., "Polyamide Reinforced EPDM Compatibilized with Maleic Anhydride Grafted Ethylene-Propylene-Diene Rubber", Polymers & Polymer Composites, vol. 11, No. 3, 2003.
La Rosa et al., "Electron Beam Curing of EVM and HNBR for Cable Compounds", Proceedings of the 55th International Wire and Cable Symposium 2005.

* cited by examiner

*Primary Examiner* — Hui Chin

(57) ABSTRACT

Disclosed herein is a polyamide-filled curable hydrocarbon elastomer compositions having enhanced heat aging performance where the presence of conventional filler, such as carbon black or silica, does not detract from desired heat stability properties. Also disclosed are polyamide-filled curable hydrocarbon elastomer compositions where the use of compatibilzer is optional, for polyamides having an inherent viscosity of greater than 0.88 dL/g.

17 Claims, No Drawings

HEAT RESISTANT HYDROCARBON ELASTOMER COMPOSITIONS

CROSS-REFERENCE TO RELATED APPLICATIONS

This application claims priority from U.S. patent application No. 61/733,074, filed on Dec. 4, 2012; and U.S. patent application No. 61/733,090, filed Dec. 4, 2012, which are incorporated herein by reference in their entirety.

FIELD OF THE INVENTION

The present invention is directed to curable hydrocarbon elastomer compositions having enhanced heat aging performance, and thermoset articles produced by the process.

BACKGROUND OF THE INVENTION

Ethylene copolymer elastomers are polymerized from ethylene and an alpha-olefin such as propylene, 1-butene, 1-hexene, 1-octene, or the like. The comonomer disrupts ethylene crystallinity at room temperature, which would otherwise produce a stiff and inelastic polymer. Typically, ethylene copolymer elastomers comprise less than about 75 wt % ethylene so as achieve a low modulus and good elastic recovery in thermoset applications.

For elastomer applications requiring resistance to temperatures in excess of about 70° C., the ethylene copolymer elastomer must be crosslinked. Free radical crosslinking may be accomplished by compounding the elastomer with peroxide or exposing an article to high energy radiation such as an electron beam. Improved reactivity towards free radical curing can be achieved by copolymerizing an unsaturated cure site monomer with ethylene and an alpha-olefin. The unsaturated cure site monomer also permits curing of the ethylene copolymer elastomer by sulfur, phenolic resin, or hydrosilation.

Ethylene copolymer elastomers comprise ethylene and an alpha-olefin, with or without a non-conjugated diene cure site monomer. Ethylene copolymer elastomers comprising ethylene, propylene, and a non-conjugated diene monomer such as ethylidene norbornene are widely available and known as EPDM rubber. In the uncrosslinked state, these polymers are generally referred to as ethylene copolymer elastomer gums, or ethylene copolymer elastomer gum rubbers. Examples of commercially available crosslinkable ethylene copolymer elastomer gums include Engage® and Nordel® from The Dow Chemical Company, Midland Mich., USA, and Vistalon® and Exact® from Exxon-Mobil Corp, Irving Tex., USA. The resulting crosslinked articles have good heat and water resistance as well as desirable electrical properties, making them suitable for wire and cable jacketing and a wide range of automotive applications including hoses, ignition cable jacketing and boots, molded or extruded tubing or hose, molded boots, belts, grommets, seals and gaskets, vibration dampeners, weather stripping, and seals.

Resistance to heat aging is a particularly desirable property in rubber parts that are used in certain wire and cable jacketing applications, as well as many under the hood automotive applications, e.g. hoses, gaskets, and seals. Because such parts may be exposed to temperatures in excess of 150° C. for periods of time, including up to several hours on a regular basis, degradation of physical properties through oxidative embrittlement can occur. In ethylene copolymer elastomers, a reduction in the strength and extensibility of the crosslinked article often results. Such effects are disclosed for example in the published presentation "A New Grade of EPDM with Improved Processing Characteristics for Automotive Hose" by M. Welker et al., presented at the ACS Rubber Division technical meeting, October 2011. Methods to enhance heat aging resistance of crosslinked ethylene copolymer elastomer compounds have involved increasing ethylene content and decreasing carbon black content in the compound to maintain constant hardness, but the high ethylene level increases polymer crystallinity and degrades elastic properties. More effective antioxidants have also been sought. However, there is still a need to improve the high temperature resistance of crosslinked articles from ethylene copolymer elastomer compounds.

Ethylene copolymer elastomer compounds generally comprise both reinforcing filler and plasticizer. Reinforcing filler increases hardness and strength of the cured compound, whereas plasticizers lower the viscosity of the compound, as well as the hardness and strength of the cured article. Manipulating filler and plasticizer level in a curable ethylene elastomer compound allows the cured articles to meet a variety of application requirements, but hot air aging can be modified only slightly through these techniques.

U.S. Pat. No. 3,965,055 discloses vulcanizates prepared from a blend of rubber and 2% to 10% of a crystalline fiber-forming thermoplastic, wherein the thermoplastic is dispersed in the rubber component in particles not greater than 0.5 micron in cross section with a length to diameter ratio greater than 2. The rubber may be EPDM and the thermoplastic may be a polyamide.

U.S. Pat. No. 4,966,940 discloses vulcanized rubber compositions comprising an ethylene alpha-olefin copolymer rubber, an ethylene alpha-olefin copolymer rubber containing an unsaturated carboxylic acid or a derivative thereof, and a 5-100 phr of a polyamide resin. The exemplified compositions contain at least 100 phr of N550 carbon black, and there is no teaching that hot air aging can be improved by reducing reinforcing filler content.

U.S. Pat. No. 6,133,375 discloses blends of functionalized rubbers with thermoplastics in which the thermoplastic component is dispersed in the rubber phase. Following addition of a curative for the rubber, the composition is crosslinked to produce a vulcanized article. Examples of functionalized rubbers disclosed include acrylic rubbers such as nitrile-butadiene rubber, hydrogenated nitrile-butadiene rubber, epichlorohydrin rubber, and rubbers on which reactive groups have been grafted, such as carboxylated nitrile-butadiene rubber. Non-functionalized rubbers include EPDM, and these may be used provided a functionalized rubber is present. Thermoplastics that are disclosed include polyetherester block copolymers, polyurethanes, polyamides, polyamide ether or ester block copolymers, and mixtures of polyamides and polyolefins. The thermoplastic component is present in sufficient amounts to increase the modulus at small elongations, and reduce the breaking stress by no more than 10% in the vulcanized article, relative to a compound lacking the thermoplastic component.

U.S. Pat. No. 8,142,316 discloses power transmission belts comprising an elastomeric/thermoplastic material for the insulation section of the belt. The thermoplastic may be a polyamide and the elastomer may be an EPDM rubber. The thermoplastic is present in amounts of 10 to 50 phr, and the rubber is present in amounts of 50 to 90 phr. There is no teaching to specifically combine EPDM and polyamide, nor to limit reinforcing filler level of an EPDM-polyamide blend, nor to any specific process for combining EPDM and polyamide.

U.S. Pat. No. 7,608,216 and U.S. Patent Application Publication 2006/0100368 disclose compositions prepared by admixing an uncured elastomer with a thermoplastic polymer or another uncured (gum) elastomer. Techniques such as fractional curing, partial dynamic vulcanization, or the use of high performance reinforcing fillers are disclosed to increase the green strength of the uncured or partially cured compound. The admixed compositions may be subsequently crosslinked with a curing agent for the elastomer component.

Thermoplastic elastomers comprising polyamides and ethylene copolymers are also known. Such compositions, often known as thermoplastic vulcanizates or TPVs, are produced by crosslinking an elastomer while simultaneously mixing with molten thermoplastic. This process, known as dynamic vulcanization, causes the thermoplastic to become the continuous phase of the blend. EP922732 discloses TPVs comprising a thermoplastic that may be a polyamide, a carboxylic acid, epoxy, hydroxyl, anhydride, or amine functionalized rubbery ethylene, and a halogenated rubbery of para-alkylstyrene and monoisoolefin of 4 to 7 carbon atoms.

*Polymer* 43 (2002) 937-945 discloses blends of EPDM and polyamides compatibilized by maleic anhydride, glycidyl methacrylate grafted EPDM, or chlorinated polyethylene (CPE). The polyamides have a melting peak temperature of 150° C. or less. The cured compositions comprise 46 to 50 phr N220 carbon black.

*Polymers & Polymer Composites* 11(2003) 179-188 discloses compatibilized blends of EPDM and low melting peak temperature polyamide (150° C.). The blends are cured at 160° C., above the melting peak temperature of the polyamide, and display weak cure response (MDR torque increase of 2 dN-m or less). The authors note that it is difficult to reinforce EPDM with high melting peak temperature polyamides such as PA6 or 6/6.

It has now surprisingly been found that when a dispersion of polyamide particles with a high melting peak temperature replaces all or most of the conventional particulate reinforcing agent in an ethylene copolymer elastomer compound, the resultant cured compositions exhibit enhanced resistance to physical property loss during heat aging. In addition, these compositions maintain the excellent tensile strength, modulus, and hardness, and elastic properties that characterize compositions containing conventional reinforcing fillers.

It has now been found possible to produce cured ethylene elastomer compositions having excellent hot air heat aging resistance through the use of a dispersion of polyamide as a reinforcing filler in an ethylene copolymer elastomer gum. To achieve good processability in the uncrosslinked state, as well as good elastic properties such as tensile elongation at break and compression set resistance after crosslinking, the polyamide must be present as a dispersed phase in the ethylene copolymer elastomer matrix. Conventional reinforcing fillers may also be present, though the amount of such fillers must be limited so that their contribution to the Shore A hardness of the cured compound is about 25 points or less. When conventional fillers contribute more than about 25 points Shore A hardness to the cured compound, hot air aging resistance declines.

SUMMARY OF THE INVENTION

Disclosed herein a curable polyamide-reinforced ethylene elastomer compound consisting essentially of
(a) a polymer blend prepared from
(i) 40 wt. % to 95 wt. % of an ethylene copolymer elastomer gum; and one of (iia) 5 wt. % to 60 wt. % of a polyamide having a melting peak temperature greater than 160° C. and an inherent viscosity greater than about 0.88 dL/g; or
(iib) 5 wt. % to 60 wt. % of a polyamide having a melting peak temperature greater than 160° C. and an effective amount of compatibilizer;
wherein the weight percentages of the ethylene copolymer elastomer gum and polyamide are based on the combined weight of ethylene copolymer elastomer gum and polyamide, and the blend exhibits a Mooney viscosity (ML1+4, 125° C.) less than 200; and
(b) a curative; and
(c) optionally, reinforcing filler with the proviso that any reinforcing filler present contributes less than about 25 points Shore A hardness to the compound after press curing.

Also disclosed is a process for making the curable polyamide-reinforced ethylene elastomer compound, said process comprising:
(i) dispersing said 5 wt. % to 60 wt. % polyamide in said ethylene copolymer elastomer by mixing at a temperature above the melting peak temperature of the polyamide to provide a blend;
(ii) and one of
(iia) wherein the inherent viscosity of the polyamide is greater than about 0.88 dL/g optionally, adding compatibilizer; or
(iib) wherein the inherent viscosity of the polyamide is 0.88 dL/g or less, adding at least an effective amount of compatibilizer; and
(iii) cooling said blend below crystallization peak temperature of said polyamide, such that the blend has a Mooney viscosity (ML 1+4, 125° C.) less than about 200;
(iv) optionally mixing the same or different ethylene copolymer elastomer into the blend from (iii) as needed to produce a blend comprising about 5% to 60 wt % polyamide; and
(v) adding a curative to the blend comprising about 5 wt % to 60 wt % polyamide at a temperature below the melting peak temperature of the polyamide; and
(vi) optionally adding reinforcing filler.

DETAILED DESCRIPTION OF THE INVENTION

The present invention relates to a curable composition comprising an ethylene copolymer elastomer gum reinforced with a dispersion of polyamide particles. It has been found that when an ethylene elastomer gum reinforced with polyamide particles is mixed with ingredients to produce a curable ethylene copolymer elastomer composition, and the cured composition derives relatively little reinforcement from the presence of carbon black or other conventional inorganic fillers, the cured composition exhibits surprising improvements in physical properties. That is, the polyamide-reinforced ethylene copolymer elastomer gum composition exhibits enhanced heat aging resistance compared to ethylene copolymer elastomer compositions that rely solely on carbon black or other fillers for reinforcement properties. Furthermore, it has been found that when the curable composition ethylene elastomer gum is reinforced with polyamide, the addition of carbon black or conventional reinforcing filler can adversely affect heat aging resistance of the compound. The term "reinforcement" refers to an increase in the Shore A hardness of the crosslinked composition, relative to the similarly crosslinked but unfilled ethylene copolymer elastomer. The term "gum" refers to an ethylene copolymer elastomer in a substantially uncrosslinked state, i.e., an ethylene copolymer elastomer having a Mooney viscosity (ML 1+4, 125° C.) of 200 or less.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene, propylene, and 3 weight % of ethylidene norbornene", or a similar description. Such a description may be considered informal in that it does not refer to the comonomers as copolymerized units; in that it does not include conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when noted) of the stated comonomers. It follows as a corollary that a copolymer is not the product of a reaction mixture containing specific amounts of the comonomer units, unless expressly stated in limited circumstances to be such.

The abbreviation "phr" as used herein retains the conventional meaning of "parts per hundred rubber". If compatibilizer is present in the polyamide-reinforced ethylene copolymer elastomer, the rubber component is taken to be the sum of compatibilizer and ethylene copolymer elastomer gum.

The ethylene copolymer elastomer gums that are used to prepare the polyamide-reinforced ethylene copolymer elastomer compositions disclosed herein are curable gums, i.e. they are substantially uncured rubbers, and retain reactivity towards crosslinking, generally by sulfur based curatives, phenolic curatives, or free radical generators such as peroxides or electron beam exposure after blending with polyamide. By substantially uncured is meant that the unblended rubber has a sufficiently low viscosity to be shaped into a finished article by molding or extrusion. Preferably, the Mooney viscosity (ASTM D1646, ML 1+4 at 125° C.) of the ethylene copolymer elastomer gum is less than 200, more preferably less than 150 and most preferably less than 100. By retaining reactivity towards crosslinking is meant that a sulfur, phenolic, or peroxide curable composition intended for production of a molded or extruded article (i.e. the composition that includes ethylene copolymer elastomer gum, polyamide, curative and optionally conventional filler) exhibits an increase in torque (MH-ML) when tested in a moving die rheometer (MDR 2000 or equivalent from Alpha Technologies, operating at an 0.5 degree arc at 180° C. for 10 minutes) of at least 2.5 dN-m, more preferably at least 4 dN-m, and most preferably more than 5.5 dN-m.

By retaining reactivity towards crosslinking for an electron beam curable composition is meant that crosslinks are formed as a result of electron beam exposure. Electron beam curing of ethylene elastomers and analysis of molecular weight between crosslinks is described in "Electron Beam Curing of EMV and HNBR for Cable Compounds", by M La Rossa, C. Wrana, and D. Achten, Proceedings of the 55th International Wire and Cable Symposium, 2005.

More specifically, the ethylene copolymer elastomer gums useful in the practice of the invention described herein comprise copolymerized units of ethylene with alpha-olefins such as propene, 1-butene, 1-hexene, 1-octene, 1-decene, and the like. Mixtures of these monomers may be used. There is no particular limiting level of these comonomers provided the ethylene content is about, or less than, 75 wt % of the copolymer. When the ethylene content exceeds about 75 wt %, the ethylene copolymer becomes sufficiently crystalline at room temperature to impair the desired elastomeric properties after curing. Therefore the term "ethylene copolymer elastomer" as used herein denotes an ethylene copolymer comprising less than about 75 wt % ethylene. Optionally, a non-conjugated diene cure site monomer is copolymerized with ethylene in addition to the alpha-olefin, for example norbonene derivatives such as ethylidene norbornene, dicyclopentadiene, 2-methyl-5-norbornene, or 2-buten-2-ylnorbonene-; linear nonconjugated dienes such as 1,4-hexadiene or 2-methylpenta-1,4-diene; monocyclic diolefins such as 1,4-cycloheptadiene or 1,5-cyclooctadiene; bicyclic diolefins such as 4,7,8,9,-tetrahydroindene or bicycle[3,2,0]-2,6-heptadiene; polyalkyenylcycloalkanes such as 1,2-divinylcyclobutane. Preferable cure site monomers are ethylidene norbornene, 1,4-hexadiene, and dicyclopentadiene. There is no particular limiting level of cure site monomer for the practice of compound disclosed herein.

Ethylene copolymer elastomer gums of this type may be prepared for example according to the procedures described in U.S. Pat. No. 2,933,480.

The polyamide reinforced ethylene copolymer elastomer gum composition used to prepare the curable compositions described herein also comprises a polyamide having a melting peak temperature greater than 160° C. as determined in accordance with ASTM D3418. Preferably the polyamide is solid at the curing temperature of the ethylene copolymer elastomer, meaning that the curing temperature is less than the melting peak temperature of the polyamide. While not wishing to be bound by theory, when the polyamide not solid at the curing temperature, curative readily diffuses into the polyamide, rendering the blend difficult to cure. Preferably, the melting peak temperature of the polyamide is greater than 180° C., most preferably greater than 200° C.

Polyamide resins are well known in the art and embrace those semi-crystalline resins having a weight average molecular weight of at least 5,000 and include those polyamide compositions that are commonly referred to as nylons. Thus, the polyamide component useful in the practice of the invention includes polyamides and polyamide resins such as nylon 6, nylon 7, nylon 6/6, nylon 6/10, nylon 6/12, nylon 11, nylon 12, polyamides comprising aromatic monomers, and poly(amide 6-b-ethylene oxide). The resins may be supplied and used in any physical form, such as pellets and particles of any shape or size, including nanoparticles.

The viscosity of the polyamide resin can be characterized by inherent viscosity, and can vary widely while meeting the aims of the present invention. To ensure that the polyamide becomes dispersed within a continuous phase of ethylene copolymer elastomer gum, it is desirable that the polyamide have an inherent viscosity greater than 0.88 dL/g, more preferably greater than 1.0 dL/g, and most preferably greater than 1.2 dL/g, measured per ASTM D2857-95, using 96% by weight sulfuric acid as a solvent at a test temperature of 25° C. In general, as the concentration of the polyamide in the ethylene copolymer elastomer blend increases, the need for a high inherent viscosity polyamide becomes more critical. In the absence of compatibilizer, polyamides with low inherent viscosity do not provide heat resistant polyamide-reinforced ethylene copolymer blends. As such, polyamides with inherent viscosity less than 0.88 dL/g cannot be used in the compositions of this invention without the presence of a compatibilizer.

The polyamide resin can be produced by condensation polymerization of equimolar amounts of a saturated dicarboxylic acid containing from 4 to 12 carbon atoms with a diamine, in which the diamine contains from 4 to 14 carbon atoms. Examples of polyamides include polyhexamethylene adipamide (66 nylon), polyhexamethylene azelaamide (69 nylon), polyhexamethylene sebacamide (610 nylon) and polyhexamethylene dodecanoamide (612 nylon), the polyamide produced by ring opening of lactams, i.e. polycaprolactam, polylauric lactam, poly-11-aminoundecanoic acid, and bis(paraminocyclohexyl)methanedodecanoamide. It is also possible to use polyamides prepared by the copolymerization of two of the above polymers or terpolymerization of the above polymers or their components, e.g. an adipic, isophthalic acid hexamethylene diamine copolymer.

Typically, polyamides are condensation products of one or more dicarboxylic acids and one or more diamines, and/or one or more aminocarboxylic acids, and/or ring-opening polymerization products of one or more cyclic lactams. Polyamides may be fully aliphatic or semi-aromatic.

Fully aliphatic polyamides useful in practice of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid, pimelic acid, suberic acid, azelaic acid, decanedioic acid, dodecanedioic acid, tridecanedioic acid, tetradecanedioic acid, and pentadecanedioic acid. Diamines can be chosen from diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides are also suitable for use in the present invention. Such polyamides are homopolymers, dipolymers, terpolymers or higher order polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids. Alternatively, an aromatic diamine such as meta-xylylene diamine can be used to provide a semi-aromatic polyamide, an example of which is a homopolymer comprising meta-xylylene diamine and adipic acid.

Preferred polyamides are homopolymers or copolymers wherein the term copolymer refers to polyamides that have two or more amide and/or diamide molecular repeat units.

The polyamide component may comprise one or more polyamides selected from Group I polyamides having a melting peak temperature of greater than 160° C., but less than 210° C., and comprising an aliphatic or semiaromatic polyamide, for example poly(pentamethylene decanediamide), poly(pentamethylene dodecanediamide), poly(ε-caprolactam/hexamethylene hexanediamide), poly(ε-caprolactam/hexamethylene decanediamide), poly(12-aminododecanamide), poly(12-aminododecanamide/tetramethylene terephthalamide), and poly(dodecamethylene dodecanediamide); Group (II) polyamides having a melting peak temperature of at least 210° C., and comprising an aliphatic polyamide selected from the group consisting of poly (tetramethylene hexanediamide), poly(ε-caprolactam), poly (hexamethylene hexanediamide), poly(hexamethylene dodecanediamide), and poly(hexamethylene tetradecanediamide); Group (III) polyamides having a melting peak temperature of at least 210° C., and comprising about 20 to about 35 mole percent semiaromatic repeat units derived from monomers selected from one or more of the group consisting of (i) aromatic dicarboxylic acids having 8 to 20 carbon atoms and aliphatic diamines having 4 to 20 carbon atoms; and about 65 to about 80 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (IV) polyamides comprising about 50 to about 95 mole percent semiaromatic repeat units derived from monomers selected from one or more of the group consisting of aromatic dicarboxylic acids having 8 to 20 carbon atoms and aliphatic diamines having 4 to 20 carbon atoms; and about 5 to about 50 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (V) polyamides having a melting peak temperature of at least 260° C., comprising greater than 95 mole percent semiaromatic repeat units derived from monomers selected from one or more of the group consisting of aromatic dicarboxylic acids having 8 to 20 carbon atoms and aliphatic diamines having 4 to 20 carbon atoms; and less than 5 mole percent aliphatic repeat units derived from monomers selected from one or more of the group consisting of an aliphatic dicarboxylic acid having 6 to 20 carbon atoms and said aliphatic diamine having 4 to 20 carbon atoms; a lactam and/or aminocarboxylic acid having 4 to 20 carbon atoms; The polyamide may also be a blend of two or more polyamides.

Preferred polyamides include nylon 6, 6/6, and Group IV polyamides having a melting peak temperature less than about 270° C. These polyamides have a melting peak temperature sufficiently high so as not to limit the scope of applications for the inventive materials, but not so high that production of the blends causes significant degradation of the ethylene copolymer elastomer gum.

Polyamides suitable for use in the curable elastomer compound disclosed herein are widely commercially available, for example Zytel® resins, available from E. I. du Pont de Nemours and Company, Wilmington, Del., USA (DuPont), Durethan® resins, available from Lanxess, Germany, and Ultramid® resins available from BASF, USA.

The polyamide-reinforced ethylene elastomer compositions of the composition disclosed herein may also comprise a polymer that functions as a compatibilizer for the ethylene elastomer and the polyamide. The compatibilizing polymer comprises ethylene and an amine or acid reactive moiety such as an anhydride, a half-ester of an anhydride, a carboxylic acid, acyl halide, or an epoxy group. The compatibilizing polymer must be present in the mixture when the polyamide is molten to function effectively. In some cases, the compatibilizer and the ethylene elastomer may be derived from the same ethylene elastomer, e.g., a maleic anhydride grafted EPDM. Suitable compatibilizers comprise Fusabond® resin and Elvaloy® resin, available from E. I. du Pont de Nemours and Company, Wilmington, Del., USA. In the absence of a compatibilizer, the cured polyamide reinforced ethylene copolymer compositions exhibit lower tensile strength and elongation, but retain excellent resistance to hot air aging provided the polyamide has an inherent viscosity greater than 0.88 dL/g.

The polyamide-reinforced ethylene elastomer disclosed herein have from 40-95 weight percent of the ethylene copolymer elastomer gum as described herein, 5-60 weight percent of the polyamide component described herein, based on the total weight of the ethylene copolymer elastomer. Preferably, the curable compositions will comprise 50 to 90 weight percent ethylene elastomer and 10 to 50 weight percent polyamide, based on the total weight of the ethylene copolymer elastomer, polyamide, and optional compatibilizer components. More preferably, the curable compositions will comprise 60 to 80 weight percent ethylene copolymer elastomer and 20 to 40 weight percent polyamide based on the total weight of the ethylene copolymer elastomer, polyamide and optional compatibilizer components. These ratios provide a polymer blend composition wherein a cured article made from the blend exhibits sufficient Shore A hardness such that little or no additional filler is needed to further increase the hardness of the cured composition.

The polyamide-reinforced ethylene copolymer elastomer compositions may be formed by mixing the polyamide component into the ethylene copolymer elastomer gum and compatibilizer as needed at temperatures above the melting peak temperature of the polyamide, under conditions that do not produce a dynamic cure of the ethylene copolymer elastomer gum, followed by cooling the thus-produced mixture. In general, the blend composition may comprise a wide range of blend morphologies, ranging from discrete polyamide particles dispersed within an ethylene copolymer elastomer gum matrix, to high aspect ratio polyamide "threads", to co-continuous structures, to discrete ethylene copolymer domains within a continuous phase of polyamide. Most of these morphologies are unsuitable for use in the present invention, because they result in a blend that may be difficult to further compound to produce a curable composition, or may exhibit poor elastic properties after curing, such as a tensile elongation to break of less than 100%. Most preferably, the polyamide is present in the ethylene copolymer elastomer gum as approximately spherical particles. The size of the particles is relatively unimportant, though tensile strength of the cured composition becomes optimal when most of the particles are about 2 um diameter or smaller.

The suitability of a given blend morphology may be easily determined by measuring the Mooney viscosity of the blend. When the polyamide comprises a continuous phase in the blend, or is present as an elongated phase with an aspect ratio greater than about 5 to 1, the Mooney viscosity (ML 1+4, 125° C., per ASTM D1646) may be unmeasureable, or if measureable, exceeds 200. By "unmeasurable" is meant that the Mooney viscometer torque limit is exceeded, or the blend does not flow sufficiently well at a temperature below the melting peak temperature of the polyamide to enable fabrication of the Mooney viscosity test specimen.

To form a polyamide-reinforced ethylene copolymer elastomer, the ethylene elastomer copolymer gum and polyamide, (after mixing, referred to as the polymer blend) and compatibilizer as needed are mixed at a temperature above the melting peak temperature of the polyamide to disperse the polyamide within the ethylene elastomer copolymer gum. The mixing step may be conducted on a heated two-roll rubber mill but is generally conducted in internal mixing equipment used to process thermoplastic compounds or formulations because of the high temperatures used. Such equipment includes Banbury® internal mixers, Haake Rheocord® mixers, Brabender Plastographs®, single and twin screw extruders, and Buss® Kneaders. The mixing step provides a polymer blend composition that, when cooled, comprises a macroscopically homogeneous mixture with an ethylene copolymer elastomer gum as a continuous phase and a polyamide discrete phase. After the ethylene copolymer elastomer gum, polyamide, and compatibilizer as needed have been mixed at a temperature of 160° C. or greater for a period sufficient to disperse the melted polyamide in a continuous phase of ethylene copolymer elastomer gum, the mixture is cooled to a temperature below the crystallization peak temperature of the polyamide. The blending and compatibilization process typically reduces the crystallization peak temperature of the polyamide to a temperature less than that of the pure polyamide. In some instances, the polyamide-reinforced ethylene elastomer exhibits multiple polyamide crystallization peak temperatures, even though the pure polyamide exhibits a single crystallization event. In these instances, the blend should be cooled to a temperature below the lowest crystallization peak temperature, or, if the crystallization peak temperature is not known, to 40° C. This process provides a polyamide-reinforced ethylene copolymer elastomer.

When the polyamide-reinforced ethylene copolymer compositions prepared by the above-described process exhibit a Mooney viscosity (ML1+4, 125° C.) of less than 200, they can be further mixed in conventional rubber processing equipment. Thus, a curative and optionally a reinforcing filler, such as carbon black or an inorganic filler, may be added to the compositions, and they may then be cured by a crosslinking reaction in a subsequent processing step.

In addition to the ethylene elastomer and the polyamide, the polyamide-reinforced ethylene elastomer composition may also comprise processing aids and compounding ingredients that are chemically stable at the mixing temperature, i.e. above 160° C. Generally, this will not include crosslinking or curing agents, accelerators, or scorch retarders. Such components generally react or decompose to some degree at temperatures of 160° C. or higher. Examples of components that may be present include other ingredients normally useful in elastomer compounds (i.e. curable formulations), such as colorants, conventional inorganic or carbon black reinforcing fillers, antioxidants, processing aids, and plasticizers. For optimal heat aging resistance, it is desirable to maintain the concentration of conventional reinforcing fillers to as low a level as possible, but other properties may be improved by inclusion of such ingredients. Most commonly, ingredients such as conventional reinforcing fillers, colorants, antioxidants, processing aids, plasticizers and the like will be added during a low temperature mixing process, for example during the step wherein a curing agent is added. These additives may be in any physical form, including in the form of nanoparticles.

Reinforcing fillers, including carbon black, may optionally be added to the polyamide-reinforced ethylene elastomer copolymer composition provided they contribute about or less than about 25 points Shore A hardness to the cured compound. Other examples of reinforcing fillers that may be included in compositions of this invention are hydrated alumina, calcium carbonate, barium sulfate, titanium dioxide, kaolin clay, silica, and silicate minerals such as magnesium silicate. All these fillers adversely affect heat aging of cured polyamide-reinforced ethylene copolymer elastomer compositions and articles. When filler is present in sufficient quantity to contribute more than about 25 points Shore A hardness to the cured compound, the filler significantly detracts from the stabilizing effect of the polyamide. The fillers may be present in forms well known in the art, including in the form of so-called nano-materials where at least one of the dimensions of the particles is smaller than 100 nm.

If conventional reinforcing fillers are used, the filler particles will be present in amounts such that the filler contributes about or less than about 25 points Shore A hardness, preferably less than 15 points hardness, and most preferably less than 10 points hardness to the press cured compound. Conventional fillers reduce the heat aging performance of the composition in proportion to their reinforcing power, i.e., their tendency to increase the Shore A hardness of the cured compound. The contribution of any conventional filler towards the Shore A hardness of the cured compound is determined by producing two compounds comprising the same ethylene copolymer elastomer, but without polyamide or optional compatibilizer. One compound is completely free of any filler other than that which may already be present in the ethylene copolymer elastomer as produced, or present in the curative, accelerator, anti-oxidant, etc. The second compound contains the amount and type of conventional reinforcing filler in question. The two compounds contain the same levels of curatives and other additives such as plasticizers on a phr basis, and are press cured in a closed mold into 2 mm thick plaques under conditions of 175° C. for 15 minutes. The Shore A hardness of both press cured compounds is determined by method ASTM D2240-05, 1 second reading, using a plied sample. The increase in Shore A hardness attributable to the conventional filler is then determined by subtracting the hardness of the unfilled plaque from that of the filled plaque.

Preferably the polyamide-reinforced ethylene copolymer elastomer compositions will be vulcanized in the presence of a peroxide or high energy radiation, e.g., by electron beam curing. Suitable peroxide curatives, also known as peroxide curing systems, comprise a peroxide and optionally a coagent. The peroxide cure system may be added to the polyamide-reinforced ethylene copolymer elastomer by conventional rubber mixing techniques. Examples of peroxides and coagents include curative systems as generally known in the art, including those described herein, operative at the temperature employed during vulcanization. For example, useful organic peroxides are those that decompose rapidly within the temperature range of 150° C. to 250° C. These include, for example, dicumyl peroxide, 2,5-bis(t-butylperoxy)-2,5-dimethylhexane, and α',α'-bis(t-butylperoxy)-diisopropylbenzene (available from Arkema Inc. under the tradename Vulcup®). In a typical vulcanizate composition the peroxide is present in amounts of from about 0.5 to 5 parts phr. The peroxide may be adsorbed on an inert carrier such as calcium carbonate, carbon black or kieselguhr; however, the weight of the carrier is not included in the above range. Generally, an optional coagent will be present to increase the state of cure of the finished part. The coagent can be for example, N,N'-(m-phenylene)dimaleamide, trimethylolpropane trimethylacrylate, tetraallyloxyethane, triallyl cyanurate, tetramethylene diacrylate, or polyethylene oxide glycol dimethacrylate. A preferred coagent is triallylcyanurate, available from Sartomer Corp., Exton, Pa., USA as SR507A. The amount of the coagent used is generally about 0 to 5 parts by weight per 100 parts ethylene copolymer (phr), preferably about 1 to 5 phr. The coagents usually contain multiple unsaturated groups such as allyl or acrylic esters. While their mode of action is not known with certainty, it is thought that they react with the initial radical formed on the polymer backbone to form a more stable radical, which undergoes coupling reactions to form crosslinks more readily than chain scission reactions.

For electron beam curing, addition of a co-agent is strongly favored to improve crosslinking efficiency. A preferred co-agent for electron beam curing is trimethylolpropane trimethacrylate.

The addition of curative to the polyamide-reinforced ethylene copolymer elastomer composition will desirably take place at a temperature below the decomposition temperature of the curative and below the melting peak temperature of the polyamide. Generally, the addition will take place at a temperature below 140° C., preferably at a temperature no greater than 120° C. The addition of the curative may take place simultaneously with the addition of optional processing ingredients, such as colorants, conventional carbon black or inorganic reinforcing agents, antioxidants, processing aids, and plasticizers, or it may be an operation separate from addition of other ingredients. The addition may be conducted on a two-roll rubber mill or by using internal mixers suitable for compounding gum rubber compositions, including Banbury® internal mixers, Haake Rheocord® mixers, Brabender Plastograph® mixers, Farrel Continuous Mixers, or single and twin screw extruders.

Curing or crosslinking of the curable polyamide-reinforced ethylene copolymer elastomer composition, also referred to as vulcanization, can be achieved by means known to cure ethylene copolymer elastomers, and typically involves exposing the curable composition to elevated temperature and elevated pressure for a time sufficient to crosslink the copolymer. Such operations generally are conducted by placing the curable composition into a mold that is heated in a press (often referred to as press-curing). Extruded parts are often cured in a pressurized autoclave. After the press cure or autoclave cycle is completed, this initial cure may be followed by an optional post-cure heating cycle at ambient pressure to further cure the ethylene copolymer elastomer. For example, the vulcanizate may be formed and cured using conventional press cure procedures at about 160° C. to about 200° C. for about 2 to 60 minutes. Post-cure heating may be conducted at about 160° C. to about 200° C. for one to several hours. Once crosslinked, the compositions described herein are not thermoplastic, but thermoset. Suitable cure conditions will depend on the particular formulation and are known to those of skill in the art.

To achieve optimal heat aging resistance, an antioxidant is desirably added to the compound prior to curing. Useful antioxidants include, but are not limited to, aryl amines, phenolics, imidazoles, and phosphites. Thus, in some embodiments, the antioxidant will be a phosphorus ester antioxidant, a hindered phenolic antioxidant, an amine antioxidant, or a mixture of two or more of these compounds. The proportion of the antioxidant compound in the composition is typically 0.1 phr to 5 phr, preferably about 0.5 phr to 2.5 phr. The weight ratio of the phenolic or amine antioxidant to the phosphorus compound in the mixtures is about 0.5 to 3, and preferably the ratio is about 1.

Examples of aryl amines that may be useful antioxidants include 4,4'-bis(α,α-dimethylbenzyl)diphenylamine, diphenylamine and alkylated diphenylamines, and N-phenyl-N'(p-toluenesulfonyl)-p-phenylenediamine. Examples of phenolic antioxidants include 4,4'-butylenebis(6-t-butyl-m-cresol), 1,3,5-trimethyl-2,4,6-tris-(3,5-di-t-butyl-4-hydroxybenzyl)benzene, and 4,4'-thiobis-(3-methyl-6-t-butylphenol). Examples of phosphite anti-oxidants include triphenylphosphite, bis(2,4-di-t-butylphenyl)pentaerythritol diphosphite, and tris(2,4-ditert-butylphenyl)phosphite. Examples of imidazole antioxidants include 2-mercaptomethylbenzimidazole, and 2-mercaptobenzimidazole. Combinations of antioxidants may be used, generally at levels between 0.5 and 5 phr based on 100 parts of the ethylene copolymer elastomer rubber in the compound.

Suitable hindered phenolic antioxidants can be, for example 4,4'-butylidenebis(6-t-butyl-m-cresol), 1,3,5-trimethyl-2,4,6-tris-(3,5-di-t butyl-4-hydroxybenzyl)benzene, 2,6-di-t-butyl-a-dimethylamino-p-cresol and 4,4'-thiobis-(3-methyl-6-t-butylphenol).

Preferred antioxidant compositions contain tri(mixed mono- and dinonylphenyl)phosphate mixed with either 4,4'-butylidenebis(6-t-butyl-m cresol) or 4,4'-bis(α,α-dimethylbenzyl)diphenylamine. Preferred antioxidant compositions contain 4,4'-bis(α,α-dimethylbenzyl)diphenylamine (available commercially as Naugard® 445 from Chemtura Corp.). Anti-oxidants may be added while the ethylene copolymer elastomer gum is melt mixed with the polyamide, or after the blend has cooled.

The vulcanizates prepared from the polyamide-reinforced ethylene copolymer elastomer compositions exhibit unusually good resistance to embrittlement during heat aging, as evidenced by a reduction in the amount of decrease in tensile elongation at break following hot air aging at 175° C. for one week. For example, cured ethylene copolymer elastomers tend to lose over 80% of their extensibility after hot air aging for 1 week at 175° C. Replacing all or some of the carbon black with a polyamide can nearly eliminate the loss of extensibility. This degree of improvement is unusual.

Vulcanizates of the polyamide-reinforced ethylene copolymer elastomer compositions prepared according to the teachings herein can be used in a wide variety of industrial applications, for production of articles including wire and cable jacketing, spark plug boots, hoses, belts, miscellaneous molded boots, seals and gaskets. Hose applications include radiator hoses, air conditioning hoses, air ducts, fuel line covers, and vent hoses.

Examples of seals include O-rings and gaskets in the cooling system and brake system, as well as belt cover seals.

Automotive tubing applications include axle vent tubing, PCV tubing and other emission control parts. The vulcanizates are also useful for manufacture of crankshaft torsional dampers where high damping over a broad temperature range is needed under high compressive and shear strains. The vulcanizates also can be used to prepare noise management parts such as grommets.

The invention is further illustrated by the following examples wherein all parts are by weight unless otherwise indicated.

EXAMPLES

Materials

ECP1 Nordel® 3720P, ethylene copolymer elastomer of composition 69 wt % ethylene, 30.5 wt % propylene, and 0.5 wt % ethylidene norbornene. Mooney viscosity (ML1+4, 125° C.) of 20, available from The Dow Chemical Co.

PA1 Polyamide 6, inherent viscosity of 1.450 dL/g, melting peak temperature approximately 220° C., available from BASF Corp. as Ultramid® B40.

PA2 Polyamide 6, inherent viscosity of 0.867 dL/g, melting peak temperature of 220° C., available from BASF Corp. as Ultramid® B24.

PA3 Polyamide 6/10, having a melting peak temperature of 225° C., amine end group concentration of about 63 meq/kg, and inherent viscosity of 1.167 dL/g.

PA4 Polyamide 6/6, having a melting peak temperature of 260° C., amine end group concentration of about 50 meq/kg, and inherent viscosity of 1.002 dL/g.

PA5 Polyamide copolymer comprising copolymerized units of hexamethylene diamine, adipic acid, and terephthalic acid, melting peak temperature of 262° C., amine end group concentration of about 74 meq/kg, and inherent viscosity of 0.892 dL/g C1 Anhydride modified ethylene copolymer, available from DuPont as Fusabond® N493.

Peroxide: mixture of the para and meta isomers of an α,α'-bis(tert-butylperoxy)-diisopropylbenzene, 40% peroxide active ingredient on kaolin clay carrier, Vul-cup® 40KE, available from Arkema Inc.

Coagent: Triallylcyanurate, available from Sartomer Corp. as SR507A.

Carbon black: N550 grade, Sterling® SO carbon black, available from Cabot Corp.

Antioxidant (AO): Naugard® 445 available from Chemtura Corp.

Zinc oxide: available from Hallstar Corp. as Kadox® 911

Test Methods

Mooney viscosity: ASTM D1646, ML 1+4, 125° C.

Cure response: Measured per ASTM D5289-07a using an MDR 2000 from Alpha Technologies operating at 0.5° arc. Test conditions of 180° C. for 10 minutes. ML refers to the minimum torque value measured during the test, while MH refers to the maximum torque value attained after ML.

Compression set: ISO 815-1:2008, 25% compression, 70 hours at 175° C. test, using type B molded buttons prepared using press cure conditions of 175° C. for 15 minutes. Data reported are the median values of 3 specimens.

Tensile properties: ASTM D412-06, die C. Samples cut from 2.0 mm thick plaques press cured 15 minutes at 175° C. Data reported are the median values of 3 specimens. Modulus at elongations of 50%, 100%, and 200% are listed as M50, M100, and M200, respectively. The rupture properties of tensile strength and elongation are indicated as Tb and Eb, (tensile at break and elongation at break, respectively).

Shore A hardness: ASTM D2240-05, 1 second reading.

Heat aging: Tensile specimens, prepared as described above are hung in a hot air oven for one week at 175° C. The specimens are further conditioned at ambient conditions of 23° C. and 50% RH for at least 24 hours before tensile properties are measured.

Inherent viscosity of polyamides: Measured per ASTM D2857-95, using 96% by weight sulfuric acid as a solvent at a test temperature of 25° C. Samples were dried for 12 hours in a vacuum oven at 80° C. before testing.

Thermal transitions: Measured per ASTM D3418-08 using a differential scanning calorimeter operating at a heating and cooling rate of 10° C. per minute.

Example 1

Polyamide-reinforced ethylene copolymer elastomers B1 through B10 were produced with formulations as shown in Table 1. The compositions were produced by charging the polymers to a Haake® Rheocord mixing bowl equipped with roller blades, operated at a set temperature of 20° C. greater than the melting peak temperature of the polyamide and at about 30 rpm rotor speed. Once the mixing bowl was fully charged, the rotor speed was increased to 100 rpm. Polymer blend melt temperature was monitored, and when the polymer blend temperature reached the melting peak temperature of the polyamide component, a timer was started. At the same time, the setpoint for the bowl temperature was lowered to match the melting peak temperature of the polyamide, and air cooling of the bowl was initiated. After three minutes of mixing, the rotors were stopped, at which point the temperature of the polymer blend was in the range of 10° C. to 25° C. greater than the melting peak temperature of the polyamide. The polyamide-reinforced ethylene copolymer elastomer blend was then removed from the bowl and cooled to room temperature (about 25° C.) before further processing.

The Mooney viscosity of compositions B1 through B10 could all be measured, and were found to be less than 200.

TABLE 1

|  | B1 % | B2 % | B3 % | B4 % | B5 % | B6 % | B7 % | B8 % | B9 % | B10 % |
|---|---|---|---|---|---|---|---|---|---|---|
| ECP1 | 70 | 70 | 70 | 70 | 70 | 60 | 60 | 60 | 60 | 60 |
| PA1 | 30 |  |  |  |  | 30 |  |  |  |  |
| PA2 |  | 30 |  |  |  |  | 30 |  |  |  |
| PA3 |  |  | 30 |  |  |  |  | 30 |  |  |
| PA4 |  |  |  | 30 |  |  |  |  | 30 |  |
| PA5 |  |  |  |  | 30 |  |  |  |  | 30 |
| C1 |  |  |  |  |  | 10 | 10 | 10 | 10 | 10 |
| Peak mixing temperature (deg C.) | 230 | 230 | 242 | 272 | 272 | 240 | 240 | 250 | 277 | 277 |
| Mooney viscosity Mooney units | 29 | 41 | 33 | 30 | 30 | 37 | 37 | 46 | 34 | 36 |

Polyamide-reinforced ethylene copolymer elastomers B1 through B10 and the unmodified ethylene copolymer elastomer gum ECP1 were used to produce curable compositions E1 through E9, CE1 and CE2 as shown in Table 2. The curable compositions were produced by conventional roll mill mixing at approximately 60° C. to blend the ingredients as shown. Compounds E1 through E9 and CE1 comprise no carbon black or other reinforcing filler, and therefore the increase in Shore A hardness attributable to such fillers is assumed to be zero.

Test results in Table 2 show that all the compositions exhibited excellent cure response. Cured compositions made from polyamide-reinforced ethylene elastomers lacking a compatibilizer, i.e., E1-E4 and CE1 exhibit lower tensile strength but comparable tensile elongation at break compared to the compositions comprising the same polyamide and compatibilizer, with one exception. CE1 comprises PA2, a polyamide with a very low inherent viscosity of 0.867 dig, and exhibits the lowest elongation to break.

After heat aging for one week at 175° C., inventive compositions E1-E9 retain excellent an elongation to break of well over 100%, and a percent change in elongation to break of −5 to +19. Comparative examples CE1 and CE2 lose over 80% of their elongation, with absolute values less then 30% elongation to break. Inventive compositions also exhibit improved tensile strength retention after heat aging, and similar compression set resistance to EC1 and EC2.

TABLE 2

|  | E1 phr | CE1 phr | E2 phr | E3 phr | E4 phr | E5 phr | E6 phr | E7 phr | E8 phr | E9 phr | CE2 phr |
|---|---|---|---|---|---|---|---|---|---|---|---|
| B1 | 142.9 |  |  |  |  |  |  |  |  |  |  |
| B2 |  | 142.9 |  |  |  |  |  |  |  |  |  |
| B3 |  |  | 142.9 |  |  |  |  |  |  |  |  |
| B4 |  |  |  | 142.9 |  |  |  |  |  |  |  |
| B5 |  |  |  |  | 142.9 |  |  |  |  |  |  |
| B6 |  |  |  |  |  | 142.9 |  |  |  |  |  |
| B7 |  |  |  |  |  |  | 142.9 |  |  |  |  |
| B8 |  |  |  |  |  |  |  | 142.9 |  |  |  |
| B9 |  |  |  |  |  |  |  |  | 142.9 |  |  |
| B10 |  |  |  |  |  |  |  |  |  | 142.9 |  |
| ECP1 |  |  |  |  |  |  |  |  |  |  | 100 |
| Peroxide | 7 | 7 | 7 | 7 | 7 | 7 | 7 | 7 | 7 | 7 | 7 |
| Coagent | 2 | 2 | 2 | 2 | 2 | 2 | 2 | 2 | 2 | 2 | 2 |
| AO | 1 | 1 | 1 | 1 | 1 | 1 | 1 | 1 | 1 | 1 | 1 |
| zinc oxide | 2 | 2 | 2 | 2 | 2 | 2 | 2 | 2 | 2 | 2 | 2 |
| Carbon black |  |  |  |  |  |  |  |  |  |  | 40 |
| Cure response | | | | | | | | | | | |
| ML (dN-m) | 1 | 0.4 | 0.9 | 0.7 | 0.8 | 1.1 | 1.1 | 1.3 | 0.9 | 1 | 1 |
| MH (dN-m) | 36.4 | 18.7 | 31.3 | 33.6 | 30.9 | 25.8 | 31.1 | 30 | 29.7 | 29.2 | 28.7 |
| MH − ML (dN-m) | 35.4 | 18.3 | 30.4 | 32.9 | 30.1 | 24.7 | 30 | 28.7 | 28.8 | 28.2 | 27.7 |
| Tensile properties and Shore A hardness after press cure | | | | | | | | | | | |
| Shore A | 75 | 79 | 78 | 76 | 75 | 72 | 76 | 75 | 76 | 75 | 75 |
| M50 (MPa) | 2.7 | 3.8 | 3.1 | 3.2 | 3 | 2.8 | 3.7 | 3.3 | 3.1 | 3 | 3.3 |
| M100 (MPa) | 3.9 | 4.9 | 4.6 | 4.8 | 4.4 | 4.7 | 6.4 | 5.5 | 5.2 | 4.9 | 6.3 |
| Tb (MPa) | 5.5 | 4.9 | 8.9 | 7.6 | 10.7 | 12 | 13.2 | 14.9 | 14.2 | 18 | 20.7 |
| Eb (%) | 150 | 115 | 185 | 170 | 195 | 185 | 180 | 205 | 195 | 230 | 220 |
| Tensile properties and Shore A hardness after press cure and 1 week heat aging at 175 C. | | | | | | | | | | | |
| Shore A | 69 | 76 | 77 | 76 | 76 | 71 | 78 | 77 | 76 | 77 | 76 |
| M50 (MPa) | 2.6 |  | 2.8 | 2.8 | 2.7 | 2.5 | 3.1 | 2.9 | 2.7 | 2.7 |  |
| M100 (MPa) | 3.2 |  | 3.6 | 3.7 | 3.6 | 3.8 | 4.3 | 4.7 | 4.3 | 4.2 |  |
| Tb (MPa) | 4 | 2.4 | 5.2 | 5.1 | 5.6 | 14.4 | 6.3 | 14.1 | 9.1 | 10.9 | 2.9 |

TABLE 2-continued

|  | E1 phr | CE1 phr | E2 phr | E3 phr | E4 phr | E5 phr | E6 phr | E7 phr | E8 phr | E9 phr | CE2 phr |
|---|---|---|---|---|---|---|---|---|---|---|---|
| Eb (%) | 160 | 20 | 200 | 185 | 185 | 220 | 185 | 215 | 195 | 225 | 30 |
| Percent change as a result of heat aging | | | | | | | | | | | |
| Tb (%) | −27 | −51 | −42 | −33 | −48 | 20 | −52 | −5 | −36 | −39 | −86 |
| Eb (%) | 7 | −83 | 8 | 9 | −5 | 19 | 3 | 5 | 0 | −2 | −86 |
| Compression set | | | | | | | | | | | |
| (%) | 22 | * | 20 | 21 | 19 | 23 | 25 | 27 | 24 | 20 | 22 |

Example 2

Polyamide-reinforced ethylene copolymer elastomer blend B6 was used to make curable compositions E10-E18 in Table 3 by conventional roll mill mixing of B6 with ECP1 and carbon black, along with a cure system, at a temperature of about 60° C. Polyamide content ranged from 30% in E10 to 5% in E16-18, while carbon black content ranged from 10 phr in E10 to 100 phr in E18. To determine the Shore A hardness points attributable to the carbon black content after curing of E10-E18, curable compositions CE3-CE10 in Table 3 were produced by roll mill mixing. CE3 comprises an unfilled curable composition, while CE4-CE10 comprise carbon black in levels corresponding to E10-E12 and E14-E18. CE2 from Table 1 contains a carbon black level corresponding to E13, and therefore was used to determine the Shore A hardness points attributable to carbon black in E13. All the curable compositions comprise the same type and level of peroxide, coagent, zinc oxide, and antioxidant.

Results in Table 3 show that all the compositions cure well. By subtracting the Shore A hardness of the unfilled CE3 from the Shore A hardnesses of CE2 and CE4-CE10, the Shore A hardness increase attributable to the 10 to 100 phr of carbon black in E10-E18 is found to range from 1 to 20 points Shore A. After heat aging one week at 175° C., E10-E16 show a high retention of tensile strength and elongation to break, with elongation to break values well over 100%. E17 and E18 contain the highest filler levels and lowest polyamide levels tested, and therefore exhibit greater degradation during heat aging than E10-E16, which contain less filler and the same or greater level of polyamide. Nonetheless, all the inventive compounds outperform comparative examples CE3-CE10, which exhibit large declines in physical properties, with low elongation to break values of 25% or less.

TABLE 3

|  | E10 phr | E11 phr | E12 phr | E13 phr | E14 phr | E15 phr | E16 phr | E17 phr | E18 phr | CE3 phr | CE4 phr | CE5 phr | CE6 phr | CE7 phr | CE8 phr | CE9 phr | CE10 phr |
|---|---|---|---|---|---|---|---|---|---|---|---|---|---|---|---|---|---|
| B6 | 96.8 | 58.8 | 27 | 27 | 27 | 27 | 17.5 | 17.5 | 17.5 | | | | | | | | |
| ECP1 | 32.3 | 58.8 | 81.1 | 81.1 | 81.1 | 81.1 | 87.7 | 87.7 | 87.7 | 100 | 100 | 100 | 100 | 100 | 100 | 100 | 100 |
| Peroxide | 7 | 7 | 7 | 7 | 7 | 7 | 7 | 7 | 7 | 7 | 7 | 7 | 7 | 7 | 7 | 7 | 7 |
| Coagent | 1 | 1 | 1 | 1 | 1 | 1 | 1 | 1 | 1 | 1 | 1 | 1 | 1 | 1 | 1 | 1 | 1 |
| Zinc oxide | 2 | 2 | 2 | 2 | 2 | 2 | 2 | 2 | 2 | 2 | 2 | 2 | 2 | 2 | 2 | 2 | 2 |
| AO | 1 | 1 | 1 | 1 | 1 | 1 | 1 | 1 | 1 | 1 | 1 | 1 | 1 | 1 | 1 | 1 | 1 |
| Carbon black | 10 | 20 | 30 | 40 | 50 | 60 | 30 | 75 | 100 | 0 | 10 | 20 | 30 | 50 | 60 | 75 | 100 |
| Polyamide wt % | 22.5 | 15 | 7.5 | 7.5 | 7.5 | 7.5 | 5 | 5 | 5 | 0 | 0 | 0 | 0 | 0 | 0 | 0 | 0 |
| response | | | | | | | | | | | | | | | | | |
| ML (dN-m) | 0.9 | 0.9 | 1 | 1.1 | 1.5 | 1.9 | 0.9 | 2.2 | 4.9 | 0.4 | 0.5 | 0.6 | 0.8 | 1.1 | 1.4 | 2.2 | 4.1 |
| MH (dN-m) | 30.4 | 31.9 | 34.2 | 36.4 | 41.8 | 46.4 | 32.7 | 50.4 | 62 | 18.7 | 23.4 | 27 | 31.4 | 36.2 | 41.5 | 47.8 | 57.7 |
| MH − ML (dN-m) | 29.5 | 31 | 33.2 | 35.3 | 40.3 | 44.5 | 31.8 | 48.2 | 57.1 | 18.3 | 22.9 | 26.4 | 30.6 | 35.1 | 40.1 | 45.6 | 53.6 |
| Tensile properties and Shore A hardness after press cure | | | | | | | | | | | | | | | | | |
| Shore A | 77 | 76 | 78 | 80 | 81 | 84 | 77 | 86 | 88 | 68 | 69 | 72 | 76 | 81 | 82 | 87 | 88 |
| M50 (MPa) | 3 | 3.2 | 3.4 | 3.8 | 4.9 | 6 | 3.1 | 8.5 | 12.8 | 1.8 | 2 | 2.4 | 3 | 4.1 | 5.7 | 7.1 | 11.3 |
| M100 (MPa) | 4.9 | 5.3 | 6.1 | 7.9 | 10.6 | 13.5 | 5.5 | 18.3 | 22.6 | 2 | 2.6 | 3.6 | 5.1 | 8.5 | 12.2 | 15.8 | |
| Tb (MPa) | 11 | 20.9 | 13.5 | 21.1 | 21.9 | 22.1 | 13.9 | 26.8 | 23.2 | 3.1 | 8.8 | 13.9 | 18.3 | 24.1 | 24.7 | 24.8 | 18.8 |
| Eb (%) | 175 | 250 | 170 | 195 | 180 | 155 | 185 | 145 | 100 | 235 | 250 | 145 | 230 | 205 | 180 | 150 | 95 |
| Increase in Shore A hardness as a result of carbon black content | | | | | | | | | | | | | | | | | |
| (points) | 1 | 4 | 8 | 11 | 13 | 14 | 8 | 19 | 20 | 0 | 1 | 4 | 8 | 13 | 14 | 19 | 20 |
| Tensile properties and Shore A hardness after press cure and 1 week heat aging at 175 C. | | | | | | | | | | | | | | | | | |
| Shore A | 77 | 79 | 81 | 82 | 85 | 87 | 78 | 91 | 86 | 61 | 80 | 80 | 84 | 80 | 82 | 85 | 93 |
| M50 (MPa) | 2.8 | 3.1 | 3.5 | 3.9 | 5.4 | 6.8 | 3.3 | 9.5 | | | | | | | | | |
| M100 (MPa) | 4.3 | 4.8 | 5.6 | 7.4 | 10.1 | 13 | 5.2 | | | | | | | | | | |
| Tb (MPa) | 9.6 | 14.6 | 10.3 | 11.8 | 13.5 | 14.8 | 8.8 | 13.5 | 13.8 | 1.4 | 1.7 | 2.4 | 4.2 | 2.9 | 4 | 5.5 | 8.3 |
| Eb (%) | 175 | 220 | 160 | 140 | 130 | 115 | 145 | 75 | 45 | 25 | 4 | 3 | 7 | 10 | 15 | 15 | 15 |

TABLE 3-continued

| | E10 phr | E11 phr | E12 phr | E13 phr | E14 phr | E15 phr | E16 phr | E17 phr | E18 phr | CE3 phr | CE4 phr | CE5 phr | CE6 phr | CE7 phr | CE8 phr | CE9 phr | CE10 phr |
|---|---|---|---|---|---|---|---|---|---|---|---|---|---|---|---|---|---|
| Percent change as a result of heat aging | | | | | | | | | | | | | | | | | |
| Tb (%) | −13 | −30 | −24 | −44 | −38 | −33 | −37 | −50 | −41 | −55 | −81 | −83 | −77 | −88 | −84 | −78 | −56 |
| Eb (%) | 0 | −12 | −6 | −28 | −28 | −26 | −22 | −48 | −55 | −89 | −98 | −98 | −97 | −95 | −92 | −90 | −84 |
| Compression set, 70 hrs at 175 C. | | | | | | | | | | | | | | | | | |
| (%) | 23 | 21 | 17 | nm | nm | nm | nm | nm | nm | 13 | 18 | 17 | 18 | nm | nm | nm | nm |

Example 3

Compositions B11-B13 were produced by melt mixing ECP1, C1, and either PA1 or PA3 on a 25 mm twin screw extruder in the formulations shown in Table 4. The compositions were extruded onto a water cooled belt and allowed to cool to room temperature before further processing. The Mooney viscosity of B12 could not be measured because it could not be shaped into a test sample at a temperature less than the melting peak temperature of PA1. B12 therefore comprises a continuous phase of polyamide and cannot be used to form an inventive composition. B11 and B13 were easily shaped by conventional roll milling to form sheets from which a Mooney sample could be stamped, and both exhibited low Mooney viscosities.

TABLE 4

| | B11 % | B12 % | B13 % |
|---|---|---|---|
| ECP1 | 65 | 32.9 | 54.6 |
| C1 | 5 | 2.5 | 4.2 |
| PA3 | 30 | | |
| PA1 | | 64.6 | 41.2 |
| Melt Temp deg C. | 252 | 255 | 249 |
| Mooney viscosity/Mooney units | 36 | * | 48 |

* not possible to measure

B11 and B13 were further mill mixed to form inventive curable compositions E19 and E20, as shown in Table 5. The results in Table 5 show that both E13 and E14 exhibit a good cure response and tensile properties after press cure.

TABLE 5

| | E19 phr | E20 phr |
|---|---|---|
| B11 | 142.9 | |
| B13 | | 170.1 |
| Peroxide | 7 | 7 |
| Coagent | 1 | 1 |
| Zinc oxide | 2 | 2 |
| AO | 1 | 1 |
| Cure Response | | |
| ML (dN-m) | 0.8 | 1.3 |
| MH (dN-m) | 28.5 | 39.2 |
| MH-ML (dN-m) | 27.7 | 37.9 |
| Tensile properties and Shore A hardness after press cure | | |
| Shore A | 76 | 80 |
| M50 (MPa) | 4.4 | 9.2 |
| M100 (MPa) | 11.2 | 19.1 |

TABLE 5-continued

| | E19 phr | E20 phr |
|---|---|---|
| Tb (MPa) | 13.8 | 23.3 |
| Eb (%) | 230 | 250 |

What is claimed is:

1. A curable polyamide-reinforced ethylene elastomer compound consisting essentially of
   (a) a polymer blend prepared from
      (i) 40 wt. % to 95 wt. % of an ethylene copolymer elastomer gum, said ethylene copolymer elastomer gum consisting essentially of copolymerized units of ethylene, alpha-olefins, and optionally a non-conjugated diene cure site monomer; and one of
      (iia) 5 wt. % to 60 wt. % of a polyamide having a melting peak temperature greater than 160° C. and an inherent viscosity greater than about 0.88 dL/g; or
      (iib) 5 wt. % to 60 wt. % of a polyamide having a melting peak temperature greater than 160° C., an inherent viscosity less than about 0.88 dL/g, and an amount of compatibilizer sufficient to provide the curable polyamide-reinforced ethylene elastomer compound with enhanced heat aging resistance;
   wherein the weight percentages of the ethylene copolymer elastomer gum and polyamide are based on the combined weight of ethylene copolymer elastomer gum and polyamide, and the blend exhibits a Mooney viscosity (ML1+4, 125° C.) less than 200; and
   (b) a curative; and
   (c) optionally, reinforcing filler, with the proviso that any reinforcing filler present contributes less than about 25 points Shore A hardness to the compound after press curing.

2. The composition of claim 1 having a cure response MH-ML of at least 2.5dN-m as determined according to ASTM D5289-07a, operating at 0.5° arc and test conditions of 180° C. for 10 minutes.

3. The composition of claim 1 wherein reinforcing filler is present, and is selected from the group consisting of carbon black, hydrated alumina, calcium carbonate, barium sulfate, titanium dioxide, kaolin clay, silica, and silicate minerals.

4. The composition of claim 3 wherein said reinforcing filler contributes less than about 15 points Shore A hardness.

5. The composition of claim 3 wherein said reinforcing filler contributes less than about 10 points Shore A hardness.

6. The composition of claim 1 comprising from about 10wt % to about 50wt % polyamide.

7. The composition of claim 1 comprising from about 20wt % to 40wt % polyamide.

8. The composition of claim 1 wherein the polyamide has an inherent viscosity greater than about 1.0 dL/g.

9. The composition of claim 1 wherein the polyamide has an inherent viscosity greater than about 1.2 dL/g.

10. The composition of claim 1 wherein the polyamide is nylon 6, or nylon 6/6.

11. The composition of claim 1 wherein said curative is a peroxide curative.

12. A process for making the curable polyamide-reinforced ethylene elastomer compound of claim 1, said process comprising:
   (i) dispersing said 5 wt. % to 60 wt. % polyamide in said ethylene copolymer elastomer by mixing at a temperature above the melting peak temperature of the polyamide to provide a blend;
   (ii) and one of
      (iia) wherein the inherent viscosity of the polyamide is greater than about 0.88 dL/g optionally, adding compatibilizer; or
      (iib) wherein the inherent viscosity of the polyamide is 0.88 dL/g or less, adding at least an amount of compatibilizer sufficient to provide the curable polyamide-reinforced ethylene elastomer compound with enhanced heat aging resistance; and
   (iii) cooling said blend below crystallization peak temperature of said polyamide, such that the blend has a Mooney viscosity (ML 1+4, 125° C.) less than about 200;
   (iv) optionally mixing the same or different ethylene copolymer elastomer into the blend from (iii) as needed to produce a blend comprising about 5% to 60wt % polyamide;
   (v) adding a curative to the blend comprising about 5wt % to 60wt % polyamide at a temperature below the melting peak temperature of the polyamide; and
   (vi) optionally adding reinforcing filler.

13. The process of claim 12, said process further comprising the step of mixing with said blend, at a temperature below the peak melting temperature of the polyamide, with additives, said additives selected from the group consisting of inorganic fillers, antioxidants, process aids, plasticizers, waxes, release aids, acid scavengers, colorants and property enhancers.

14. The process of claim 12 wherein said polyamide is nylon 6 or nylon 6/6.

15. The process of claim 12 wherein said curative is a peroxide curative.

16. The process of claim 12, said process further comprising forming said curable composition into a desired article and curing said composition.

17. The process of claim 16 wherein said formed article is selected from the group consisting of wire jacketing, cable jacketing, molded or extruded tubing or hose, or molded boots, belts, grommets, seals and gaskets.

* * * * *